United States Patent [19]

Meredith

[11] 4,029,634

[45] June 14, 1977

[54] FLAME RETARDANT POLYMERIC COMPOSITIONS CONTAINING HALOGEN SUBSTITUTED HEXAKIS-(SUBSTITUTED PHENOXY)CYCLOTRIPHOSPHAZENE

[75] Inventor: Philip Lacy Meredith, Wilmington, Del.

[73] Assignee: E. I. Du Pont de Nemours and Company, Wilmington, Del.

[22] Filed: Oct. 1, 1976

[21] Appl. No.: 728,752

Related U.S. Application Data

[63] Continuation-in-part of Ser. No. 573,979, May 2, 1975, abandoned.

[52] U.S. Cl. .................. 260/45.9 NP; 260/75 P; 260/551 P; 260/927 N
[51] Int. Cl.² ............................................ C08D 3/20
[58] Field of Search ............... 260/45.9 NP, 551 P, 260/927 N, 75 P

[56] References Cited

UNITED STATES PATENTS

| | | | |
|---|---|---|---|
| 3,291,865 | 12/1966 | Kober et al. | 260/551 P |
| 3,505,087 | 4/1970 | Godfrey | 260/927 N |
| 3,865,783 | 2/1975 | Clutter | 260/45.9 NP |
| 3,890,092 | 6/1975 | Garner | 260/45.9 NP |

OTHER PUBLICATIONS

Textile Research Journal, Feb. 1956, pp. 141–144, Hamalainen et al.

Primary Examiner—Eugene C. Rzucidlo

[57] ABSTRACT

Polymers such as polyamides, polyolefins, etc., in the form of fibers, films, etc., are rendered flame retardant by incorporation of a halogen substituted hexakis-(substituted phenoxy)cyclotriphosphazene, such as hexakis-(p-bromophenoxy)cyclotriphosphazene, in the polymer.

17 Claims, No Drawings

FLAME RETARDANT POLYMERIC COMPOSITIONS CONTAINING HALOGEN SUBSTITUTED HEXAKIS-(SUBSTITUTED PHENOXY)CYCLOTRIPHOSPHAZENE

CROSS REFERENCE TO RELATED APPLICATION

This application is a continuation-in-part of application Ser. No. 573,979, filed May 2, 1975 now abandoned.

BACKGROUND OF THE INVENTION

With the discovery of polymer chemistry the fabric and film industries were revolutionized and many useful man-made compositions were developed to improve the quality of life in general. However, the search for polymeric compositions with improved properties has been a continual one. It has long been recognized that polymeric products, particularly fibers, films, fabrics and molded articles, when subject to excessive heat or contact with open flame, could be improved by imparting flame retardant properties to such products. The art of treating polymers is replete with attempts to reduce the flammability of such products.

Approaches such as coating the article, adding a flame retardant compound during polymerization, or incorporating the retardant in the polymer after polymerization have been attempted with various levels of success.

Perhaps the most common approach to treating articles such as polymeric fibers, films and fabrics has been to coat the article with a substance that would render the article resistant to burning. Such coatings are often removed during the useful life of the article by being worn off or washed out.

Incorporating the flame retardant material into the article itself appears to hold the most promise for the future; however, this approach has often been unsuccessful due to undesirable changes in the properties of the polymer or unacceptable impact on processing equipment by the flame retardant additive. It has now been discovered that certain hexakis(substituted phenoxy)cyclotriphosphazenes when incorporated into polymeric compositions render such compositions flame retardant without significant adverse affect on the useful properties of the polymeric compositions.

Certain of the hexakis(substituted phenoxy)cyclotriphosphazenes employed in the compositions of this invention are known in the art and the preparation of said compounds was reported by Dell, Fitzsimmons and Shaw in an article entitled Phosphorous-Nitrogen Compounds, Part XIII, Phenoxy and p-Bromophenoxy-chlorocyclotriphosphazatrienes, in J. Chem. Soc. 4070–4073 (1965).

Unsubstituted hexakis(substituted phenoxy)cyclotriphosphazenes are disclosed in U.S. Pat. No. 3,859,249 as being useful flame retardants in polyester when added at the start of ester interchange. The flame retardant component of the compositions of this invention are incorporated into the polymer to be protected after polymerization but prior to formation of the finished article. The physical properties of the polymer such as viscosity, dyeability, tensile strength, etc., are not adversely affected by the component incorporation of the flame retardant compounds of this invention if the flame retardant compound contains 50 ppm or less of residual chloride ion.

SUMMARY OF THE INVENTION

This invention relates to flame retardant polymeric compositions comprising:

a. a polymer selected from the group consisting of polyester, polyamide, ABS, acrylic, modacrylic and polyolefin;

b. a flame retardant effective amount of a phosphazene containing 50 ppm of residual chloride ion or less and which has the formula

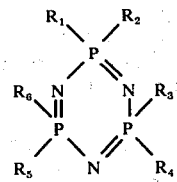

wherein each of $R_1$ to $R_6$ is a substituent of the formula

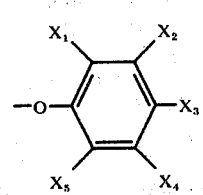

wherein $X_1$ to $X_5$ is hydrogen, bromine or chlorine, provided, however, that at least one of $X_1$ to $X_5$ is other than hydrogen.

DESCRIPTION OF THE INVENTION

The present invention provides polymeric compositions possessing improved flame retardant properties.

In this specification flame retardance is used to describe the reduced tendency of a hexakis(substituted phenoxy)cyclotriphosphazene containing polymeric composition to burn when the composition is ignited in a flame which is subsequently withdrawn when compared to the polymer which has no hexakis(substituted phenoxy)cyclotriphosphazene incorporated therein.

This invention relates to polymeric compositions containing a flame retardant effective amount of a hexakis(substituted phenoxy)cyclotriphosphazene of Formula I. As indicated above, for purposes of this invention a flame-retardant effective amount of hexakis(substituted phenoxy)cyclotriphosphazene is that amount of hexakis(substituted phenoxy)cyclotriphosphazene which when combined with a polymer will reduce the tendency of the polymer to burn when exposed to a flame. In general, from one to thirty percent by weight of hexakis(substituted phenoxy)cyclotriphosphazene when combined with a polymer will render the polymeric composition flame retardant. The actual amount of hexakis(substituted phenoxy)cyclotriphosphazene employed depends upon the polymer component of the composition and the end use in which the composition will be employed. It will be understood that from 3 to 25% by weight of hexakis(substituted phenoxy)cyclotriphosphazene is effective in polyester compositions, from 1 to 30% by weight of hexakis(substituted phenoxy)cyclotriphosphazene is effective in polyolefin, from 0.5 to 12% by weight of hexakis(substituted phenoxy)cyclotriphosphazene is effective in polyamide, from 5 to 30% by weight of hexakis(substituted phenoxy)cyclotriphosphazene is effective in ABS, from 5 to 35% by weight of hexakis(-substituted phenoxy)cyclotriphosphazene is effective in acrylic and from 5 to 15% by weight of hexakis(substituted phenoxy)cyclotriphosphazene is effective in modacrylic.

The hexakis(substituted phenoxy)cyclotriphosphazene compounds of this invention contain 50 ppm or less of residual chloride ion and are generally crystalline at room temperature, colorless, odorless and nontoxic. Further, the hexakis(substituted phenoxy)cyclotriphosphazenes of this invention are thermally stable under the normal processing conditions employed in the manufacture of polymeric films, fibers and fabrics. For purposes of this specification thermally stable means the hexakis(substituted phenoxy)cyclotriphosphazene does not degrade under normal polymer processing, such as in preparing melt or solution of the polymer which is employed in spinning fibers; extruding films; or weaving and dyeing of fabrics. The hexakis(substituted phenoxy)cyclotriphosphazenes are also non-volatile, photostable and economic to use.

In addition to the above properties, the compositions are durable, for example, when treated fibers are woven into fabric the fabric retains its flame retardant properties for at least 50 home launderings and the fabric is not discolored by exposure to u.v. light.

A still further advantage is that the flame retardant of the type and purity described is incorporated during normal processing of the polymer normal processing of the polymer and does not require either a change in polymerization chemistry or an aftertreatment of the polymer composition. Specifically the low levels of residual chloride are necessary since residual chloride is known to depolymerize synthetic polymer melts during normal processing. Furthermore, residual chloride levels of greater than 50 ppm are known to corrode processing equipment at undesirable rates.

By residual chloride is meant the inorganic chloride present either as in an ionic salt or bonded directly to the phosphorus atoms of the phosphazene ring. These phosphazene chlorines upon hydrolysis are readily detectable as ionic chloride.

However, it is observed that when polyester containing a hexakis(substituted phenoxy)cyclotriphosphazene is subjected to commercial heat and/or dyeing treatments, the hexakis(substituted phenoxy)cyclotriphosphazene to some degree migrates to the surface of the composition. For reasons of processing and durability, this migration may restrict the end use of the flame-retarded polyester composition. This phenomenon has not been observed in the other polymer systems of this invention.

The polymeric component of the compositions of this invention consists of polyesters such as polyethylene terephthalate, polybutylene terephthalate and the like; polyamides such as those prepared from hexamethylenediamine and adipic acid (referred to as Nylon 6,6), polycaprolactam (referred to as Nylon 6), bis(4-aminocyclohexyl) methane and dodecane adipic acid and the like; terpolymers of acrylonitrile, butadiene and styrene (referred to as ABS); acrylics such as polyacrylonitrile; modacrylics such as acrylonitrile copolymerized with vinyl or vinylidine halides; polyolefins such as polyethylene or polypropylene; polycarbonates; epoxy resins; polyurethans and polyphenylene oxides.

The flame retardant component of the compositions of this invention as stated above is a compound containing 50 ppm or less residual chloride ion and is represented by the formula

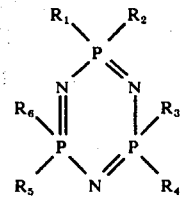

wherein each of $R_1$ to $R_6$ is a substituent of the formula

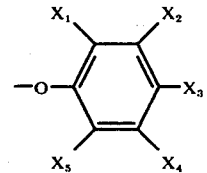

wherein $X_1$ to $X_5$ is hydrogen, bromine or chlorine, provided, however, that at least one of $X_1$ to $X_5$ is other than hydrogen.

It will be understood that $R_1$ to $R_6$ can be the same or different in any given compound of this invention.

Furthermore it will be understood that the number of molecules were $R_1$ to $R_6$ equals Cl is so limited as to give a residual inorganic chloride analysis of 50 ppm or less.

Of the compounds of this invention compounds of the above formula wherein $R_1$ to $R_6$ are

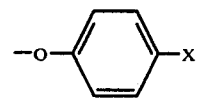

where X is bromine are preferred because of their compatibility with the various polymer systems and also because of their ease of preparation.

As will be observed, the flame retardant component of the compositions of this invention combine in one molecule sources of both phosphorous and halogen. The stability of these compounds to light and normal processing conditions is particularly desirable and it is believed that both the phosphorous and halogen present in these compounds contribute to the flame retardant effectiveness of the compositions of this invention.

As is explained below the compounds of this invention are synthesized from chlorophosphazenes. It is essential that all or nearly all of the residual chloride ion be eliminated from the composition and from the phosphazene ring. It is, therefore, essential that pure hexachlorocyclotriphosphazene of limited contamination by residual $PCl_5$ and like inorganic phosphorus-chlorine fragments, the phosphazene tetramer, and higher phosphazene oligomers be employed to insure that 50 ppm or less of residual chloride ion remain in the hexakis(substituted phenoxy)cyclotriphosphazene of this invention. such low chloride levels assure first that essentially all the chlorine atoms attached to the cyclotriphosphazene ring have been replaced and secondly that the compounds of this invention will be suitable for use in commercial operations.

This is not to say that a high purity tetramer or higher oligomer would not also be acceptable, but under the conditions of the disclosed process the number of unrelated PCl sites is higher in the higher phosphazenes which result in residual chloride at unacceptable levels.

An alternative method for preparing these high purity hexakis(substituted phenoxy)cyclotriphosphazenes is to use a mixture of chlorophosphazenes and extensively wash or recrystallize the crude product to remove all products but the desired one and to retain it at an acceptable chloride level.

The hexakis(substituted phenoxy)cyclotriphosphazene component of the compositions of this invention are prepared by reacting hexachlorocyclotriphosphazene and an appropriate substituted phenol or phenols as is hereinafter described.

EXAMPLE 1

To 500 ml. of 1,2-dimethoxyethane is added 119 g. of potassium hydroxide pellets (85% by weight KOH) and 311 g. p-bromophenol. The resultant mixture is stirred for 60 minutes and then 93 g. of a mixture of chlorophosphazens, of which a majority by weight is hexachlorocyclotriphosphazene, is added. The resultant mixture is heated and refluxed for four hours and is then cooled to room temperature, with stirring. After stirring overnight the slurry is poured into ice water. The aqueous slurry is agitated in a Waring blender and is then filtered. The mixing-washing procedure is continued until a negative test for chloride is obtained. The resulting filtrate, hexakis(p-bromophenoxy(cyclotriphosphazene, is dried at 110° C. to give a white powder, m.p. 172° C.

To demonstrate that low residual chloride hexakis(p-bromophenoxy)cyclotriphosphazene is necessary for polymer processing when molten, a sample of crude material prepared by Example 1 was recrystallized to different levels of residual chloride and samples were tested in molten nylon. Analysis of the residual chloride was by X-ray fluoescence. Five percent by weight of the additive was dissolved into 66 nylon salt and held at 283° C. under steam for thirty minutes. Under these conditions an incompletely substituted phosphazene will react with the nylon polymer generating free p-bromophenol and a complex nylon-phosphorus residue. As the level of p-bromophenol rises, processing becomes more difficult and the resulting polymer more unacceptable for use. Two samples of hexakis(p-bromophenoxy)cyclotriphosphazene of known residual chloride were so tested and found to be marginally acceptable; however, it is obvious that higher levels of chloride would be unacceptable for processing.

| % Hexakis-(p-bromophenoxy)-cyclotriphosphazene | Residual chloride in additive | % p-bromophenol detected |
|---|---|---|
| 5 | 20–30 ppm | 0.20 |
| 5 | < 10 ppm | 0.10 |

EXAMPLES 2-6

The hexakis(substituted phenoxy)cyclotriphosphazene components of the compositions of this invention can be prepared according to the following procedure:

In a 1-liter, 3-necked, round-bottomed flask fitted with condenser, Dean-Stark trap and addition funnel, 0.22 moles of the appropriate phenol are dissolved into 250 ml. toluene and treated with 0.22 mol KOH pellets (85% by weight KOH). The mixture is heated at reflux for two hours during which time water is collected in the Dean-Stark trap, followed by cooling to room temperature.

To the cooled mixture is added, dropwise, in less than 30 minutes, 0.33 mol hexachlorocyclotriphosphazene dissolved in 100 ml. toluene. Following addition of hexachlorocyclotriphosphazene, the mixture is heated at reflux for 12 hours and cooled to room temperature.

The cooled mixture is treated in a pear-shaped separator funnel with 100 ml. 10% aqueous KOH solution, the aqueous layer is removed and the treatment is repeated with 100 ml. 5% aqueous KOH solution. Following removal of the last aqueous wash solution the toluene is dried and is then removed by evaporation at reduced pressure to leave the desired products as oils, which in most cases solidify on cooling.

Subsequently each product is repeatedly recrystallized from benzene/ether or other suitable solvent or otherwise purified to reach the desired chloride level.

This procedure is used for each phenol listed below to give the corresponding hexakis(substituted phenoxy)cyclotriphosphazene.

| Example | Phenol | Product |
|---|---|---|
| 2 | 3,4,5-trichlorophenol | hexakis(3,4,5-trichlorophenoxy)cyclotriphosphazene, m.p. 210° C. |
| 3 | p-bromophenol | hexakis(p-bromophenoxy)-cyclotriphosphazene, m.p. 174° C. |
| 4 | p-chlorophenol | hexakis(p-chlorophenoxy)-cyclotriphosphazene, m.p. 151° C. |
| 5 | o-bromophenol | hexakis(o-bromophenoxy)-cyclotriphosphazene, m.p. 103–105° C. |
| 6 | 2,4-dibromophenol | hexakis(2,4-dibromophenoxy)-cyclotriphosphazene, m.p. 174–180° C. |

EXAMPLE 7

In a 4-liter, round-bottomed flask fitted with condenser, 2 liters methyl cellosolve is treated with 610 g. p-bromophenol. After all the phenol has dissolved, the solution is treated with 239 g. KOH pellets (85%). The temperature normally rises 20°–25° C. during the addition of phenol and base. The solution is stirred for one-half hour to insure complete phenoxide formation.

Subsequently 209 g. $(NPCl_2)_3$ is added over a 15-minute period and the entire solution is brought to reflux for three hours. Following reflux, the solution is cooled to room temperature and filtered to give a filter cake of KCl and hexakis(p-bromophenoxy)cyclotriphosphazene (1070 g.). The cake is washed with one liter of fresh cellosolve and two liters distilled water to give 440 g. of a wet, white powder which dries at 90° C. to 410 g. hexakis(p-bromophenoxy)cyclotriphosphazene (58% of theoretical yield, m.p. 172° C.–176° C. Analysis of the residual chloride level by X-ray fluorescence finds the chloride level to be ca 20 ppm.

As mentioned above a melt additive such as the flame retardant of this invention must be suitable for incorporation directly into a molten polymer at temperatures of about 225° C. The composition must be thermally stable in the polymer melt, such as polyethylene terephthalate, at such elevated temperatures and also be capable of being pumped into the polymer stream.

To demonstrate these properties the compound prepared in Example 7 is tested as described below to measure viscosity and density at 180° C.–220° C.

The product of Example 7 is melted in an open beaker in an oil bath. A Brookfield viscometer (Model LVT-1/5) is used with spindle No. 1. The viscosity remains essentially constant over the indicated temperature range at a particular shear. At very low shear (0.3 RPM) ca 180–200 centipoises is measured; at higher shear (60 RPM) the viscosity averages about 10 centipoises.

Density is measured by weighing a known amount of the product of Example 7 into a 10 ml. graduate and holding at a bath temperature for 20 minutes. At 185° C. density is 1.63 g./ml; at 220° C. density is 1.60 g./ml. This same material shows no weight loss to 300° C.–335° C. by thermogravimetric analysis. Melt stability is further tested by holding the additive in a Wood's Metal bath at 225° C. under nitrogen for intervals of 7–8 hours. Infrared spectra show no major changes after 48 hours. The same test in the open air for several hours (5–10) shows a darkening of the melt. Less pure additive darkens and exhibits changes in viscosity more rapidly under the same testing.

The product of Example 7 is also tested for its corrosion properties on steel. When the steel is brought into contact with the product of Example 7 in the molten state at 225° C., it is found that carbon steel is corroded at a rate of 1mil/year based on a 38-hour exposure. Corrosion rates for 304 and 316 stainless steels are less than 0.1 mil/year.

The above examples have demonstrated the preparation of individual hexakis(substituted phenoxy)cyclotriphosphazenes of this invention. In some situations it may be economically advantageous to prepare the flame retardant hexakis(substituted phenoxy)cyclotriphosphazene from crude grade phenols from industrial operations. In situations such as this, a mixed phenol rather than a pure single phenol is used as a starting material. The reaction is conducted in the same fashion as above but one obtains a product which is a mixture of hexakis(substituted phenoxy)cyclotriphosphazenes. A representative preparation is presented below.

EXAMPLE 8

In a 1-liter, 3-necked, round-bottomed flask fitted with condenser, Dean-Stark trap and addition funnel, 50 g. of a mixture of phenols (the mixture being comprised of 80% by weight p-bromophenol, 5% o-bromophenol, 12.5% 2,4 dibromophenol and 2.5% phenol) is dissolved into 250 ml. of toluene and treated with 12.3 g. of KOH. The mixture is heated at reflux for two hours during which time water is collected in the Dean-Stark trap, followed by cooling to room temperature.

To the cooled mixture is added, dropwise, in less than 30 minutes, 14.7 g. of hexachlorocyclotriphosphazene dissolved in 100 ml. toluene. The mixture is then heated at reflux for 12 hours and cooled to room temperature.

The mixture is successively washed and separated from 100 ml. 10% aqueous KOH solution and 100 ml. 5% KOH solution. Following removal of the last aqueous wash solution in a pear-shaped separatory funnel, the toluene is dried and is then removed by evaporation at reduced pressure to leave 47 g. of a mixture of bromoaryloxycyclotriphosphazenes as a turbid viscous liquid with the approximate formula $[NP(OC_6H_4Br_1)_2]_3$. In view of the composition of the starting phenolic mixture the product is composed of a number of the phenolic isomers of cyclotriphosphazene in which there is approximately one atom of bromine for each phenoxy molecule. From the composition of the starting material, it will be understood that the mixture will contain monobromo and dibromo phenoxy as well as unsubstituted phenoxy additions to the cyclotriphosphazene ring.

TESTS FOR FLAME RETARDANCY

Horizontal Burn Test Preparation of Test Films

A composition of this invention was prepared by intimately mixing a polymer powder and hexakis(substituted phenoxy(cyclotriphosphazene and then melt pressing this mixture into an 8-mil film with a fiberglass fabric as support. (the fiberglass fabric is style No. 1562, 0.005 inch thick, from Burlington Glass Fabrics Co.).

The melt pressing was done as follows: Films three inches square were prepared using a sandwich technique. The appropriate opening was cut into a copper shim, 0.002 inches thick and six inches square. A four-inch square sheet of aluminum was placed on a Squeege plate cut to fit into the press. (The aluminum sheet had been pretreated with Dow Corning R-671 resin, air dried, then heated at 250° C for one hour and at 300° C. for one-half hour, to facilitate removal of clear films.) The fiberglass fabric and shim were placed over the aluminum sheet and about 1.8 g. of dry blend of polymer and hexakis(substituted phenoxycyclotriphosphazene was spread within the opening. A second aluminum sheet and Squeege plate was placed on top. The sandwich was put into the press which was then barely closed with no pressure applied.

The sandwich was allowed to heat up until both plates of the mold registered 280° C. After waiting thirty seconds, the mold was released, then closed under approximately 500 lbs. pressure for thirty seconds. While releasing the pressure the sandwich was pulled out and immediately dropped into ice and water, quenching the film. The aluminum sheets were peeled off the shim, the film was cut from the shim, dried at 50° C. and stored in a desiccator until used.

Test Procedure

The following test procedure was followed to compare the burn rate and burn length of various films prepared as described above: Films 1 ¼× 3 were cut from the pressed squares and mounted in a U-shaped clamp such that an area of 1× 3 was exposed. Both ends of the film were exposed while the two sides were inhibited. The clamp was mounted horizontally in a burning chamber arranged to insure a constant updraft.

The film samples were ignited with a wooden match. At the half-inch mark (as designated by the sample holder), the stop watch was started. The burning rate is based on the time required for the flame to progress from a point 0.5 inches from the open end of the specimen to a point 0.5 inches from the clamped end of the specimen. The flame front usually moved forward smoothly.

In Table I and Table II the test compound is listed in the first column, notation of Control means that the polymer alone without test compound was burned. The second column lists the percent loading, i.e., the amount of test compound hot pressed into the polymer on a W/W basis. The third column Burn Rate reports the velocity of the burn in inches per minute.

TABLE I

FLAME RETARDANCE IN POLYETHYLENE TEREPHTHALATE

| Test Compound | % Loading W/W | Burn Rate (In./Min.) |
|---|---|---|
| 1. Control - No compound added | — | 3.00 |
| 2. Hexakis(p-bromophenoxy)-cyclotriphosphazene | 10% | None* |
| 3. Hexakis(p-chlorophenoxy)-cyclotriphosphazene | 7.4%<br>6.0% | 1.94<br>2.20 |
| 4. Hexakis(3,4,5-trichlorophenoxy)-cyclotriphosphazene | 11.3% | None* |
| 5. Hexakis(2,4-dibromophenoxy)-cyclotriphosphazene | 2%<br>6% | 2.7<br>1.8 |

*(extinguished as soon as match was removed)

TABLE II

FLAME RETARDANCE IN POLYPROPYLENE

| Test Compound | % Loading | Burn Rate |
|---|---|---|
| 1. Control (Profax 7523) Polypropylene | — | 3.8 |
| 2. Hexakis(p-bromophenoxy)-cyclotriphosphazene | 30% | 0.92 |

UL-94 Test

In addition to the above tests a composition of this invention was tested in accordance with the test procedure published by the Underwriters Laboratory and designated UL-94. The composition is prepared by compounding 25 g. of hexakis(p-bromophenoxy)cyclotriphosphazene with 75 g. of polybutylene terephthalate at 240° C. on a three-inch two roll mill. The compounded material is compression molded into bars 0.125 × 0.5 × 5. Three bars are evaluated using the procedure described in UL-94 for vertical burning. None of the three bars burned on the first ignition and the burn time averaged only one second on the second ignition. Based on these results, the composition is rated V-2 as defined in UL-94. By contrast, the same polybutylene tetephthalate without cyclotriphosphazene burned vigorously and was not self-extinguishing.

MVSS 302 Test

Compositions of this invention were tested to determine whether fabric of polypropylene containing hexakis(p-bromophenoxy)cyclotriphosphazene is effective as a flame retardant when tested in accordance with the procedure set out in Title 49 CFR as Motor Vehicle Safety Standard No. 302, Flammability of Interior Materials.

The hexakis(p-bromophenoxy)cyclotriphosphazene is mixed with the polypropylene and co-extruded into fibers and the fibers are heat bonded to form a fabric. In a fabric with a weight of 2.5 oz. per square yard, a 2.5% (W/W) loading of the hexakis(p-bromophenoxy)cyclotriphosphazene is sufficient to allow the fabric to pass the MVSS 302 flammability test. A loading of 5% (W/W) is required to allow a 4 oz. per square yard polypropylene fabric to pass this test.

NFPA 701 Test

Compositions of this invention were tested to determine whether fabric of polypropylene containing hexakis(p-bromophenoxy)cyclotriphosphazene is effective as a flame retardant when tested in accordance with the procedure set out in the National Fire Codes 1975, Codes and Standards of National Fire Protection Association, Volume 11.

The hexakis(p-bromophenoxy(cyclotriphosphazene is mixed with the polypropylene and co-extruded into fibers and the fibers are heat bonded to form a fabric. In a fabric with a bonded weight of 4 oz. per square yard, a 20% (W/W) loading of the hexakis(p-bromophenoxy)cyclotriphosphazene is sufficient to allow the fabric to pass the NFPA 701 flammability test. This result is summarized in Table III.

TABLE III

FLAME RETARDANCE IN POLYPROPYLENE FABRIC

| Test Fabric | % Loading (W/W) | Char Length | Flame Time |
|---|---|---|---|
| 1. 4 oz./yd.$^2$, bonded weight | Control | 6.5 inches | 15 sec. |
| 2. 4 oz./yd.$^2$, bonded weight | 20% | 4.1 inches | 0 sec. |

LOI Determination

Limiting Oxygen Index (LOI) values are determined in accordance with procedures developed by C. P. Fenimore and F. J. Martin (Modern Plastics, 45, No. 15, 141, 146, 148, 192, Nov., 1966) as modified by G. G. Tesoro and C. H. Meiser, Jr. (Textile Res. J. 40, 430–436, May 1970). An increase in LOI value over the LOI of a control material is accepted by those skilled in the art as a good and reproducible measure of the effectiveness of a flame retardant.

The films to be used in the procedure are prepared as follows: A stock solution of polyacrylonitrile is made by incorporating polymer into dimethylformamide, to this solution is added the desired amount of hexakis(p-bromophenoxy)cyclotriphosphazene. The resulting solution is used to heat cast films on clean glass plates. A 20-mil doctor knife gives films about four mils thick after drying. After drying the films are stripped from the plates and steamed for 30 minutes to remove traces of the solvent. The test results are reported in Table IV below.

TABLE IV

| % Loading (W/W) | LOI |
|---|---|
| 0 (Control) | 0.180 |
| 21 | 0.212 |
| 26 | 0.216 |
| 30 | 0.220 |

FF:3-71 Test

Various types of fabrics are made from the above fibers and tested in accordance with the standard for the flammability of children's sleepwear [DOC-FF-3-71].

Modacrylic Fabric

The flame retardancy of compositions of this invention are run in compliance with DOC-FF-3-71 but without drying prior to testing and are presented in Table VII.

TABLE VI

FLAME RETARDANCE IN NYLON FABRICS

| Fabric, Jersey Knit[1] | % Loading | Residual Flame Time Average | Residual Flame Time Maximum | Average Char Length | FF-3 |
|---|---|---|---|---|---|
| Antron III[2] | 0 | 31 sec. | 69 sec. | 4.7 inches | Fail |
| (3.2 oz./sq. yd.) | | | | | |
| (3.5 oz./sq. yd.) | 5 | 1.3 sec. | 7.0 sec. | 3.4 inches | Pass |
| 66/B-12[3] | | | | | |
| (3.0 oz./sq. yd.) | 0 | 5.5 sec. | 15.3 sec. | 3.4 inches | Fail |
| (3.0 oz./sq. yd.) | 2.8 | 2.5 sec. | 8.8 sec. | 2.9 inches | Pass |

[1]Jersey knit prepared with "Flame-Safe" polyester seam.
[2]Antron®III = nylon 66 with 5.8% HECO (Hydrogenated ethoxylated castor oil), 0.2% Ionox 330, 0.01% manganese hypophosphite, and 0.75% TiO$_2$.[3]66/B-12 = nylon 66 with 6% N-butyl 612 polyamide and 0.75% TiO$_2$.

tion are also shown in fabrics produced from fibers containing polyacrylonitrile-vinyl chloride copolymers containing 10% by weight of hexakis(p-bromophenoxy)cyclotriphosphazene. The results of the test are presented in Table V below.

TABLE V

| Fabric | Char Length Average | Char Length Maximum | Residual Flame Time Average | Residual Flame Time Maximum |
|---|---|---|---|---|
| Plain Woven (4 oz. per sq. yard) | 3.4" | 4.5" | 2.5 sec. | 7.4 sec. |
| Single Jersey Knit (5 oz. per sq. yard) | 2.0" | 3.7" | 2.1 sec. | 10.5 sec. |
| Double Interlock Knit (7 oz. per sq. yard) | 2.0" | 4.4" | 3.0 sec. | 15.1 sec. |

Nylon Fabric

Antistatic nylon yarn compositions of this invention are prepared by coating nylon flakes with hexakis(p-bromophenoxy)cyclotriphosphazene, spinning fibers and preparing corresponding yarns.

The flake is coated and dried under vacuum and is then spun at 290° C., encountering a holdup time of up to 20 minutes at temperatures of 260°–285° C. The resulting fiber is drawn 2.4×, receives standard finishes and is rolled at 2660 to 2910 yards per minute in a hot chest at 165° C. The additive has no adverse effect on yarn properties, dye rate and dye lightfastness. Tensile properties of the modified yarns are equivalent to the control. The flame retardance of this additive in nylon fabrics is demonstrated in Table VI which reports test results in compliance with DOC-FF-3-71.

Polyethylene Terephthalate Fabric

A polyester staple fiber is prepared by injecting molten hexakis(p-bromophenoxy)cyclotriphosphazene at 225° C. into a stream of molten polyethylene terephthalate at 285° C., mixing with Kenics mixer and pumping a 900-hole spinnerette at 69 l.b./hr. The resulting fiber is wound at 1590 yards per minute, is drawn 3 times in hot water bath and is then crimped. The resulting 1.5 denier per filament is cut and has a 4.3 grams per denier tenacity and is processed into spun yarns. Two fabrics are prepared from this fiber. Flammability test results for these fabrics and comparable controls

TABLE VII

FLAME RETARDANCE IN POLYESTER TEREPHTHALATE FABRICS

| Fabric | % Loading | Char Length Average | Total burn time Average |
|---|---|---|---|
| Plain woven (4.9 oz./sq. yd.) | 10 | 6.2 cm. | 0.0 sec. |
| (5.0 oz./sq. yd.) | 0 | 9.0 cm. | 17.6 sec. |
| Satin weave (8.0 oz./sq. yd.)[1] | 10 | 6.5 cm. | 18.3 sec. |
| (8.0 oz./sq. yd. | 0 | 11.3 cm. | 34.0 sec. |

[1]warp = 20% owf (on weight fabric), (100% PET). fill = 80% owf (90% PET, 10% flame retardant).

The above tests demonstrate the versatility of the flame retardant component of the compositions of this invention and the ability of the polymeric compositions of this invention to surpass the many flame retardant requirements that have been promulgated for various applications. It will be understood that the foregoing description is illustrative and is not intended to limit the invention to the specific applications described herein.

What is claimed is:

1. A flame retardant polymeric composition comprising a polymer and a flame retardant effective amount of a compound of the formula:

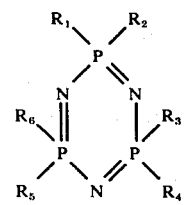

where $R_1$ to $R_6$ has the formula

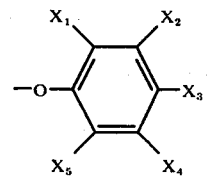

wherein $X_1$ to $X_5$ are hydrogen, bromine or chlorine, provided that at least one X is other than hydrogen and that said compound contains less than 50 ppm residual chloride ion.

2. A flame retardant polymeric composition of claim 1 wherein the polymer is selected from the group consisting of polyester, polyamide, ABS, acrylic, modacrylic and polyolefin.

3. A flame retardant polymeric composition of claim 2 wherein in the flame retardant compound $R_1$ to $R_6$ are the same.

4. A flame retardant polymeric composition comprising
   a. a polymer selected from the group consisting of polyester, polyamide, ABS, acrylic, modacrylic and polyolefin; and
   b. a flame retardant effective amount of a compound of the formula

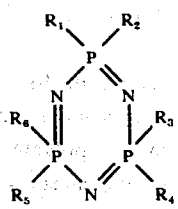

wherein each of $R_1$ to $R_6$ is a radical of the formula

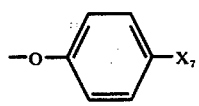

wherein $X_7$ is selected from the group consisting of chlorine or bromine, provided said compound contains less than 50 ppm of residual chloride ion.

5. A flame retardant polymeric composition comprising
   a. a polymer selected from the group consisting of polyester, polyamide, ABS, acrylic and polyolefin; and
   b. a flame retardant effective amount of compound of the formula which contains less than 50 ppm residual chloride ion

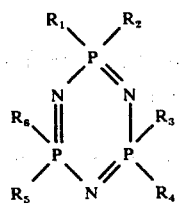

wherein $R_1$ to $R_6$ is

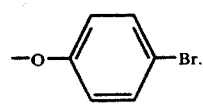

6. A flame retardant polymeric composition comprising from 75 to 97% by weight of polyester and from 3 to 25% by weight of a phosphazene which contains less than 50 ppm of residual chloride ion which has the formula

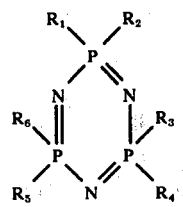

where $R_1$ to $R_6$ is

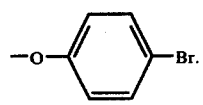

7. A flame retardant polymeric composition comprising from 70 to 99% by weight of polyolefin and from 1 to 30% by weight of a phosphazene which contains less than 50 ppm of residual chloride ion which has the formula

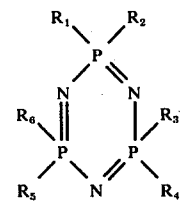

where $R_1$ to $R_6$ is

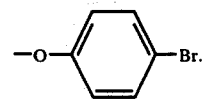

8. A flame retardant polymeric composition comprising from 88 to 99.5% by weight of polyamide and from 0.5 to 12% by weight of phosphazene which contains less than 50 ppm of residual chloride ion which has the formula

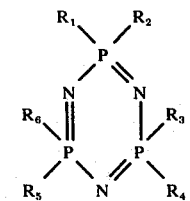

where $R_1$ to $R_6$ is

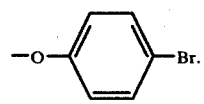

9. A flame retardant polymeric composition comprising from 70 to 95% by weight of ABS and from 5% to 30% by weight of a phosphazene which contains less than 50 ppm of residual chloride ion which has the formula

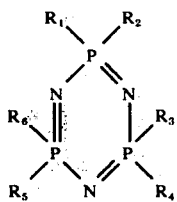

where $R_1$ to $R_6$ is

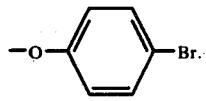

10. A flame retardant polymeric composition comprising from 65 to 95% by weight of acrylic and from 5 to 35% by weight of a phosphazene which contains less than 50 ppm of residual chloride ion which has the formula

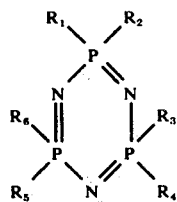

where $R_1$ and $R_6$ is

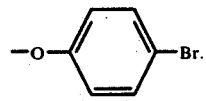

11. A flame retardant polymeric composition comprising from 85% to 95% by weight modacrylic and from 5 to 15% by weight of a phosphazene which contains less than 50 ppm of residual chloride ion which has the formula

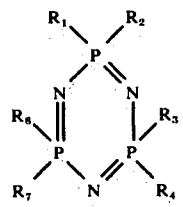

where $R_1$ and $R_6$ is

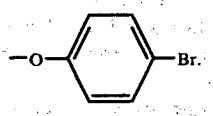

12. A textile fiber formed from the composition of claim 6.

13. A textile fiber formed from the composition of claim 7.

14. A textile fiber formed from the composition of claim 8.

15. A textile fiber formed from the composition of claim 10.

16. A textile fiber formed from the composition of claim 11.

17. A method of decreasing the susceptibility of a polymer to burn when exposed to open flame consisting of incorporating into the polymer a flame retardant effective amount of a phosphazene which contains less than 50 ppm of residual chloride ion which has the formula

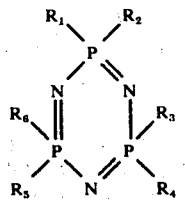

where $R_1$ to $R_6$ has the formula

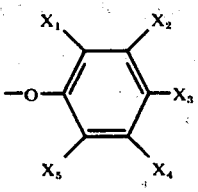

wherein $X_1$ to $X_5$ are hydrogen, bromine or chlorine, provided, however, that at least one X is other than hydrogen.

* * * * *